Oct. 8, 1940.  R. CARLSTEDT  2,217,537
TRANSMISSION MEANS
Filed Feb. 11, 1939
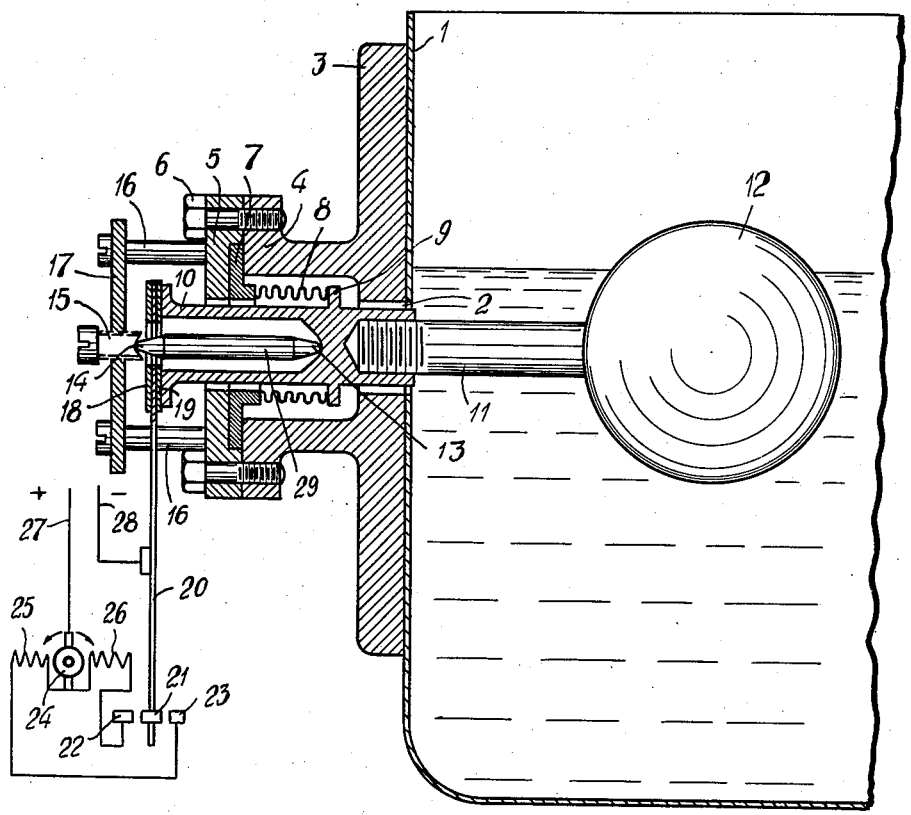
Inventor:
Ragnar Carlstedt
By Cushman, Darby & Cushman
Attys.

Patented Oct. 8, 1940

2,217,537

UNITED STATES PATENT OFFICE 2,217,537

TRANSMISSION MEANS

Ragnar Carlstedt, Stockholm, Sweden

Application February 11, 1939, Serial No. 256,003
In Sweden September 1, 1937

2 Claims. (Cl. 286—29)

The present invention relates to means for transmitting the movement of a member located within a receptacle or the like to the outside of the receptacle by means of an arm which extends through an opening of the receptacle. The invention has for its object to provide means which will operate practically without friction and independently of variations of the pressure prevailing in the receptacle and render possible perfect fluid tightening between the interior of the receptacle and the transmission means.

I attain this object by mechanism illustrated in the accompanying drawing which illustrates a section through a preferred embodiment of the invention applied to a float regulator.

In the drawing, numeral 1 indicates a portion of the wall of a receptacle which has an opening 2 and to which there is secured in any suitable manner, such as by welding, a plate 3 having a registering opening. The plate 3 has a flange 4 to which there is secured a ring 5 by means of bolts 6. A ring 7 which is fixed to one end of a cylindrical bellows 8 is clamped between the parts 4 and 6. The bottom of the bellows, that is the portion located nearest the receptacle, is secured to a finge 9 of a hollow member 10 which together with a rod 11 constitutes the arm for transmitting the movement of the float 12 to the outside of the receptacle. Due to the tension exerted by the bellows, the arm 10, 11 is pressed against one end 13 of a pointed pin 29 the other end 14 of which rests on the recessed end of a screw 15 which is adjustable in a stationary plate 17 secured to standards 16.

The outer end of the hollow member 10 is connected with a contact arm 20 clamped between insulating disks 18 and 19 and carrying at its lower end a contact member 21 which together with contacts 22 and 23 constitutes a contact device for a reversible electric motor diagrammatically shown in the drawing. The field windings 25 and 26 of the motor are arranged, in a manner known, to generate opposite fields. By means of the wire 27, the armature of the motor is connected to a source of current which through a wire 28 is connected to the contact arm 20.

Upon variation of the liquid level in the receptacle the arm 10, 11 will turn about an axis located substantially near the point of contact between the pin 29 and the hollow member 10. Depending upon the direction of this turning movement, the contact 21 will touch either of the contacts 22, 23 whereby the motor 24 will be started in the one or other direction of rotation and actuate a pump, valve member or the like, not shown in the drawing, for reestablishing the normal level of the liquid in a manner known per se. When the float then returns to its normal position, the contacts will be opened and the motor will come to a rest.

Any variation of the pressure prevailing in the receptacle will be taken up by the pin 29 which prevents axial movement of the float arm.

The friction occurring in the transmitting means is extremely low, since only the points of contact of the pressure pin with the cones formed by the arm and the screw 15 are subject to friction which, however, is practically without influence and can be regarded as not existing so that the transmission can be said to operate without friction. Also the tightening by means of the bellows 8 does not cause any friction.

Obviously, the arrangement described may be employed for other purposes than the regulation of the level of a liquid, for instance, for the transmission of the movement of a differential gauge arranged in a fluid conduit. Instead of being used for regulating purposes, the arrangement described may be used for the indication of movements, in which case the movement of the arm is suitably geared up so as to obtained increased turns.

What I claim is:

1. A sealed bearing for receptacles including a movable member extending into the receptacle, a fluid tight bellows, a stationary member, said bellows being connected at one end to the movable member and at its other end to said stationary member so as to prevent leakage from the receptacle and for exerting axial pressure on said movable member, a supporting member spaced from the movable member, and a pin extending between and engaging said supporting member and said movable member for preventing axial displacement of said movable member, the end of the bellows connected to the stationary member being located between two planes extending through the ends of the pin at substantially right angles to the longitudinal axis thereof.

2. A sealed bearing for receptacles including a movable member extending into the receptacle, a fluid tight bellows, a stationary member, said bellows being connected at one end to the movable member and at its other end to said stationary member so as to prevent leakage from the receptacle and for exerting axial pressure on said movable member, a supporting member and said movable member having opposed coned surfaces, and a pin extending between said supporting member and said movable member, said pin having pointed ends engaging said coned surfaces for preventing axial displacement of said movable member, the ends of the bellows connected to the stationary member being located between two planes extending through the ends of the pin at substantially right angles to the longitudinal axis thereof.

RAGNAR CARLSTEDT.